United States Patent
Jiang et al.

(10) Patent No.: US 8,159,655 B2
(45) Date of Patent: Apr. 17, 2012

(54) OPTICAL BLIND-GUIDE APPARATUS AND METHOD THEREOF

(75) Inventors: Joe-Air Jiang, Taipei (TW); Jih-Huah Wu, Taoyuan County (TW); Yi-Chia Shan, Taoyuan County (TW)

(73) Assignee: National Taiwan University, Taipei (TW)

( * ) Notice: Subject to any disclaimer, the term of this patent is extended or adjusted under 35 U.S.C. 154(b) by 338 days.

(21) Appl. No.: 12/552,267

(22) Filed: Sep. 1, 2009

(65) Prior Publication Data

US 2010/0296076 A1    Nov. 25, 2010

(30) Foreign Application Priority Data

May 20, 2009  (TW) .............................. 98116803 A (51) Int. Cl.
*G01C 3/00* (2006.01)
*G01C 3/08* (2006.01)
(52) U.S. Cl. ...................................... 356/3.11; 356/4.01
(58) Field of Classification Search ................. 356/3.11, 356/4.01
See application file for complete search history.

(56) References Cited

U.S. PATENT DOCUMENTS

| | | | | |
|---|---|---|---|---|
| 4,712,003 A * | 12/1987 | Ban et al. | ...................... | 250/221 |
| 5,539,990 A * | 7/1996 | Le | .................................. | 33/283 |
| 5,687,136 A * | 11/1997 | Borenstein | ..................... | 367/116 |
| 6,164,544 A * | 12/2000 | Schwartz et al. | ......... | 235/462.43 |
| 7,755,744 B1 * | 7/2010 | Leberer | .......................... | 356/5.1 |
| 7,869,061 B2 * | 1/2011 | Sato et al. | ...................... | 356/610 |
| 2004/0233414 A1 * | 11/2004 | Jamieson et al. | ............. | 356/4.01 |
| 2008/0309913 A1 * | 12/2008 | Fallon | ........................... | 356/4.01 |
| 2010/0068680 A1 * | 3/2010 | Quintilio | ....................... | 434/112 |

FOREIGN PATENT DOCUMENTS

| TW | 324163 | 7/1986 |
|---|---|---|
| TW | 200806273 | 2/2008 |

OTHER PUBLICATIONS

Watson, James V. Dual Laser Beam Focussing for Flolw Cytometry Through a Single Crossed Cylindrical Lens Pair, Univesity and MRC Department of Clinical ONcology and Radiotherapeutics, Hills Road Cambridge CB2 2QH, England, Mar. 1981.*

* cited by examiner

*Primary Examiner* — Thomas Tarcza
*Assistant Examiner* — Antoine J Bedard (57) ABSTRACT

An optical blind-guide apparatus for detecting an object is provided. The optical blind-guide apparatus includes an illuminant module illuminating the object to form a reflection light from the object; a sensor sensing the reflection light to generate a digital message; a system module receiving and processing the digital message to obtain a blind-guide information; and an output device coupled with the system module and outputting the blind-guide information.

19 Claims, 6 Drawing Sheets

OPTICAL BLIND-GUIDE APPARATUS AND METHOD THEREOF

FIELD OF THE INVENTION

The present invention relates to a blind-guide apparatus, and more particularly to an optical blind-guide apparatus and the method thereof.

BACKGROUND OF THE INVENTION

Recently, with progress of the technology and high development of the culture, development of everything is toward user friendly and convenient direction. However for the blind, complete blind-guide facilities will contribute largely to convenience of the blind's action. The method for helping the blind to act without obstacles is not beyond the scope of warning the blind by blind-guide facilities, for example, providing warning voice at traffic lights or in the elevator, or setting up blind-guide bricks on the sidewalk. However, all these blind-guide facilities are not enough and cause inconvenience for the blind. Other methods such as eye cornea surgery and setting up electronic eyes to help the blind rebuild the vision are expensive, and for the present technology, electronic eyes can only let the blind see light-spots and simple geometric figures. Therefore, auxiliary tools of blind-guide become indispensable tools for leading the blind.

Auxiliary tools use various principles. For example, Taiwan Patent No. 324163 discloses a blind-guide walking stick whose principle is similar to the principle of detecting obstacles when bats fly. First, the blind-guide walking stick emits ultrasonic waves, and the ultrasonic waves are reflected by obstacles to form reflection waves. The bat senses the time interval between emitting and receiving the ultrasonic waves to estimate the distance between the obstacles and the bat itself, and the blind-guide walking stick can estimate the distance between the object and the blind user. Finally, the blind user is notified of the distance in voice.

Taiwan Patent Application No. 095127251 discloses an electronic blind-guide device, which uses GPS collocated with the electronic map to tell the blind where he is in voice. Besides, the mentioned electronic blind-guide device can also detect the obstacles around the blind and send out warning, and has the function of recording the environmental image.

However, the method of detecting obstacles in the prior art is not accurate enough. In order to overcome the drawbacks in the prior art, an optical blind-guide apparatus and the method thereof are provided. The particular design in the present invention not only solves the problems described above, but also is easy to be implemented. Thus, the present invention has the utility for the industry.

SUMMARY OF THE INVENTION

In accordance with one aspect of the present invention, an optical blind-guide apparatus which can detect the distance between the obstacles and the blind user, and estimate the sizes of the obstacles more exactly is provided.

In accordance with another aspect of the present invention, an optical blind-guide apparatus for detecting an object is provided. The optical blind-guide apparatus comprises an illuminant module, a sensor, a system module, and an output device. The illuminant module illuminates the object to form a reflection light from the object. The sensor senses the reflection light to generate a digital message. The system module receives and processes the digital message to obtain a blind-guide information. The output device is coupled with the system module and outputs the blind-guide information.

Preferably, the system module obtains information of a distance between the object and the optical blind-guide apparatus by the digital message and a distance calculation, and the output device provides a user with the information of the distance.

Preferably, the distance calculation is one selected from a group consisting of a phase method, a time-of-flight method and a triangulation.

Preferably, the illuminant module generates a beam having various wavelengths and comprises a horizontal cylindrical lens and a vertical cylindrical lens, the horizontal cylindrical lens disperses the beam into a vertical fan-shaped beam, and the vertical cylindrical lens disperses the beam into a horizontal fan-shaped beam.

Preferably, the reflection light comprises a first part having a first wavelength between 700 and 1200 nm and a second part having a second wavelength different from the first wavelength, and the filter makes the first part pass through and filters out the second part.

Preferably, the sensor comprises an image sensor, which is one of a CCD and a CMOS image sensors.

Preferably, the optical blind-guide apparatus further comprises a storage device for saving a data generated from the system module.

Preferably, the data is a compressed data.

Preferably, the optical blind-guide apparatus further comprises an interface for coupling the optical blind-guide apparatus to an outside device, and transmitting the data to the outside device via the interface.

Preferably, the outside device is a communication device.

In accordance with a further aspect of the present invention, an optical blind-guide apparatus is provided. The optical blind-guide apparatus comprises a sensor and a system module. The sensor receives a reflection light from an object to generate a message. The system module receives and processes the message to obtain a blind-guide information.

Preferably, the optical blind-guide apparatus further comprises a laser beam module for generating a laser beam to illuminate the object and obtain the reflection light, wherein the message is a digital message, and the laser beam module comprises a horizontal cylindrical lens and a vertical cylindrical lens, the horizontal cylindrical lens disperses the laser beam into a vertical fan-shaped laser beam, and the vertical cylindrical lens disperses the laser beam into a horizontal fan-shaped laser beam.

Preferably, the laser beam module generates the laser beam per a time interval to reduce power consumption of the laser beam module, and the time interval is in a range of $1/15$ to $1/60$ second.

Preferably, the optical blind-guide apparatus further comprises an output device coupled to the system module and outputting the blind-guide information, and a storage device for saving a data generated from the system module.

Preferably, the optical blind-guide apparatus further comprises an interface for coupling the optical blind-guide apparatus to an outside device and transmitting the data to the outside device via the interface.

In accordance with further another aspect of the present invention, a method for operating an optical blind-guide apparatus is provided. The method includes steps of (a) receiving a reflection light from an object, (b) converting the reflection light to a message, and (c) obtaining a blind-guide information based on the message.

Preferably, the step (a) further comprises a sub-step of generating a beam for illuminating the object to form the reflection light.

Preferably, the beam is an infrared laser beam.

Preferably, the step (b) further comprises a sub-step of detecting a distance between the object and the optical blind-guide apparatus based on the message and a distance calculation, which is one selected from a group consisting of a phase method, a time-of-flight method and a triangulation.

Preferably, the method further comprises a step (c) of providing a user with the blind-guide information in a voice.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
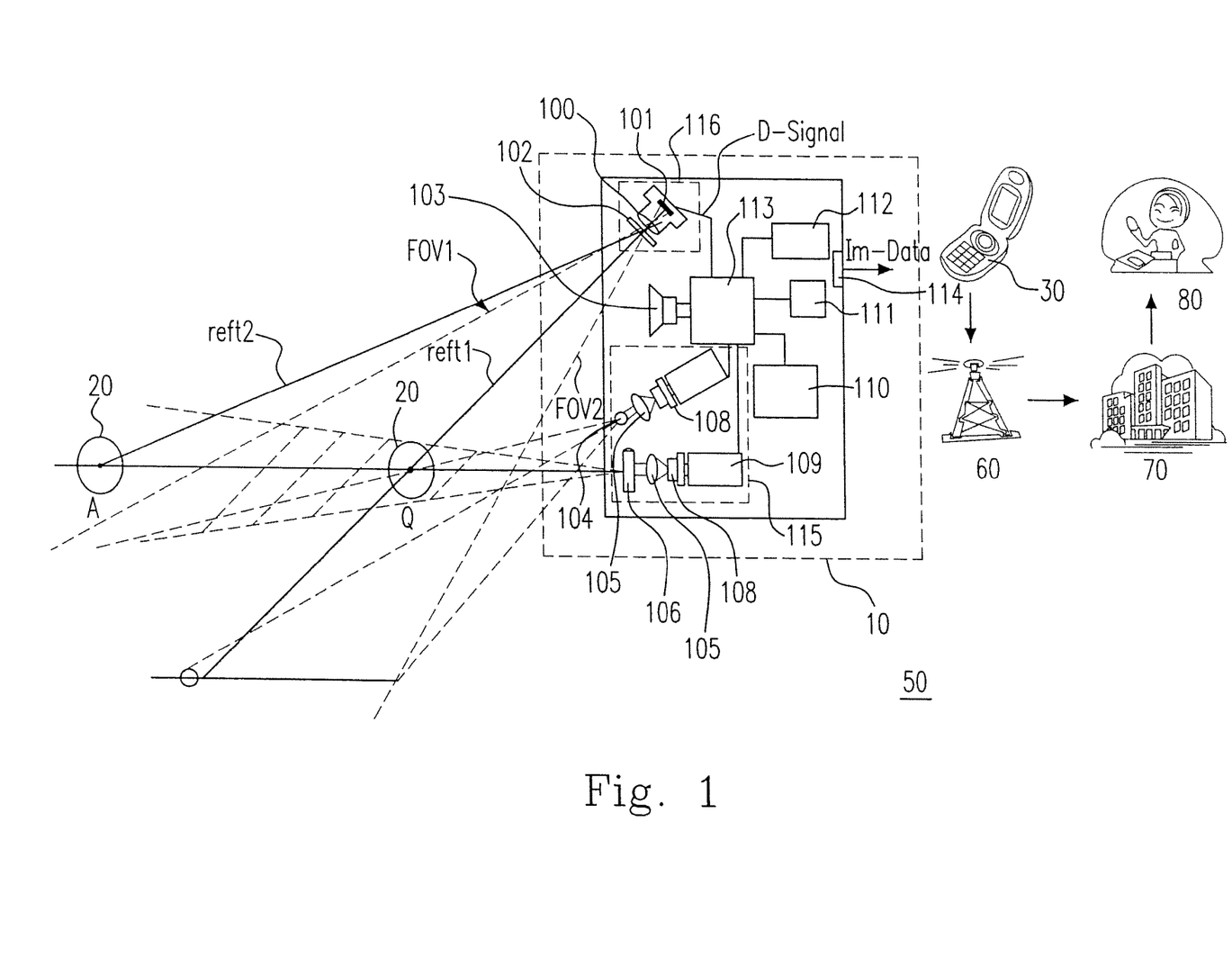
FIG. 1 shows the diagram of the blind-guide system.

Please refer to FIG. 1, which shows the diagram of the blind-guide system. The blind-guide system 50 comprises an optical blind-guide apparatus 10, an object 20, a communication device 30, a base station 60, a telecommunication company 70, and a service center 80. The optical blind-guide apparatus 10 is coupled with an outside device 30 which is a communication device. The communication device sends image data Im_Data to the telecommunication company 70 via the base station 60, and then the telecommunication company 70 sends image data Im_Data to the service center 80. The optical blind-guide apparatus 10 is used for detecting the object 20. The optical blind-guide apparatus 10 comprises an illuminant module 115, an image sensor device 116, a system module 113, a compressed chip 110, an SD memory card 111, an SDRAM memory 112, a mini USB interface 114, and an audio device 103. The illuminant module 115 comprises two laser-driven circuits 109, two laser diodes 108, two collimated lenses 105, a vertical cylindrical lens 106, and a horizontal cylindrical lens 104. The image sensing device 116 comprises a filter turntable 102, lens 100 and an image sensor 101. The image sensor 101 could be a CCD or a CMOS image sensor. The filter turntable 102 can chose to filter or not to filter the visible light. Filtering the visible light can reduce quantity of data to facilitate the processing of the system module 113. The system module 113 could be a single chip, a system on chip, or a built-in system.

The image sensing device 116 receives a first vertical infrared reflection FOV1 and a second vertical infrared reflection FOV2. When the object 20 is at Q point, the image sensing device 116 receives a first reflection reft1, and when the object 20 moves to A point, the image sensing device 116 receives a second reflection reft2. The image sensing device 116 generates a digital message D_Signal in response to the first vertical infrared reflection FOV1, the second vertical infrared reflection FOV2, the first reflection reft1 and the second reflection reft2. The system module 113 receives the digital message D_Signal, and uses the digital message D_Signal and a triangulation to obtain a first distance D1 and/or a second distance D2 between the object 20 and the optical blind-guide apparatus 10, and/or obtain the size of the object 20. The audio device 103 is coupled with the system module 113, and the system module 113 enables the audio device 103 to remind the user of road condition in voice.

Figure 2A:
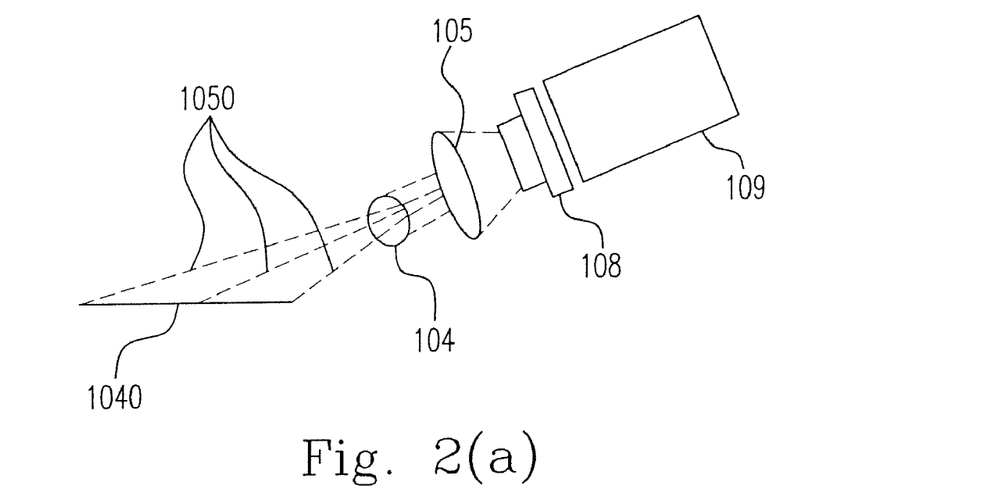
FIG. 2(a) shows the diagram of the vertical infrared rays emitted from the optical blind-guide apparatus.

Please refer to FIG. 2(a), which shows the diagram of the vertical infrared rays emitted from the optical blind-guide apparatus. The laser-driven circuit 109 is coupled with the laser diode 108, and enables the laser diode 108 to emit the infrared laser beam 1050. Then, the infrared laser beam 1050 passes through the horizontal cylindrical lens 104 to form a vertical infrared ray 1040. Please refer to FIG. 2(b), which shows the diagram of the horizontal infrared rays emitted from the optical blind-guide apparatus. The laser-driven circuit 109 is coupled with the laser diode 108, and enables the laser diode 108 to emit infrared laser beam 1050. Then, the infrared laser beam 1050 passes through the vertical cylindrical lens 106 to form a horizontal infrared ray 1060.

Figure 2B:
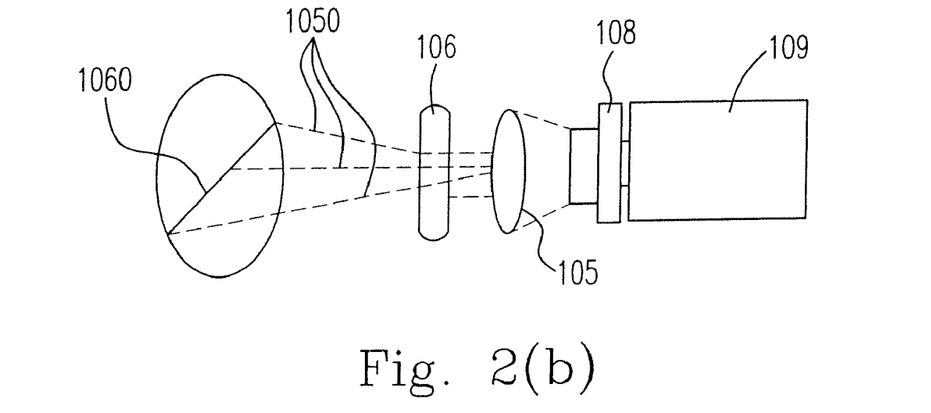
FIG. 2(b) shows the diagram of the horizontal infrared rays emitted from the optical blind-guide apparatus.

The illuminant module 115 emits the infrared laser beam 1050 per a time interval to reduce power consumption thereof, wherein the time interval is in a range of $1/15$ to $1/60$ second. The wavelength of the infrared laser beam 1050 is 700 to 1200 nm, and the wavelength of the infrared laser beam 1050 emitted from the laser diode 108 is 808 nm, but they are not limited to the mentioned ranges. As long as the light can be reflected back after contacting the object 20 and then received by the image sensing device 116, it can serve as the light to be emitted.

Figure 3A:
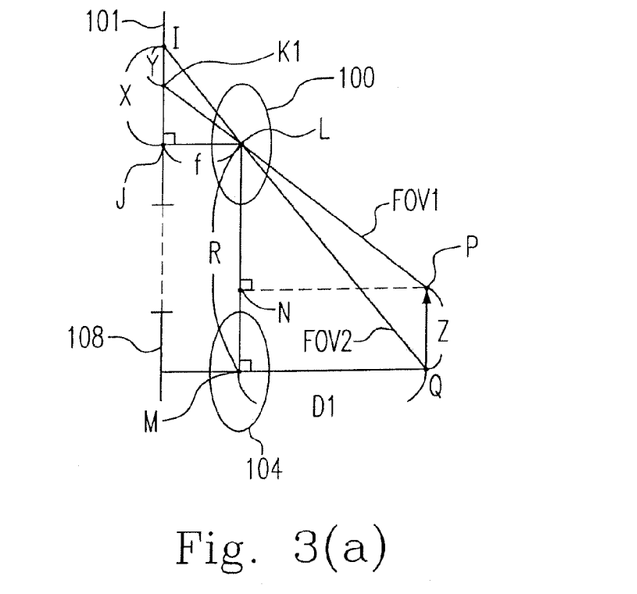
FIG. 3(a) shows the diagram of measuring the object's height by triangulation in the system module.

Please refer to FIG. 3(a), which shows the diagram of measuring the object's height by triangulation in the system module. As long as the height and width of the object 20 can be obtained, the size thereof can be estimated. Firstly, how to calculate the height of the object 20 is described, and the width of the object 20 is calculated by the same way. Following is a preferred embodiment of measuring the size of the object 20. Take measuring the height of the object 20 by the vertical infrared ray 1040 as the example. In FIG. 1, the range formed by the first vertical infrared reflection FOV1 and the second vertical infrared reflection FOV2 covers the height of the object 20, as shown in FIG. 3(a).

in FIG. 3(a), R represents the distance from the central point L of the filter turntable 102 to the central point M of the horizontal cylindrical 104, the first distance D1 represents the distance from M point in the horizontal cylindrical lens 104 to Q point at which the object 20 is, and f represents the distance from the central point L of the lens 100 to J point in the image sensor 101. The bottom of the object 20 locates at Q point, and forms image at I point in the image sensor 101. The top of the object 20 locates at P point, and forms image at K1 point in the image sensor 101.

In FIG. 3(a), X represents the distance from I point to J point, and Y represents the distance from I point to K1 point. The line formed by J point and L point is perpendicular to that formed by J point and I point, and the line formed by N point and P point is perpendicular to that formed by N point and L point. Two similar groups of perpendicular triangles can be seen in FIG. 3(a). The first group includes perpendicular triangles I-J-L and L-M-Q, and the second group includes perpendicular triangles K1-J-L and L-N-P. The first distance D1 can be obtained by sensing X, and the height Z of the object 20 can be obtained by sensing X and Y. X can be obtained by sensing the location of the second vertical infrared reflection FOV2 in the image sensor 101 via the image sensor 101, and Y can be obtained by sensing the location of the first vertical infrared reflection FOV1 in the image sensor 101 via the image sensor 101.

The method of calculating the first distance D1 is described as follows. Because the perpendicular triangle I-J-L is similar to the perpendicular triangle L-M-Q, a first equation $X/f=R/D1$ can be obtained therefrom. As R and f are known constants and X is a known sensing value, the first distance $D1=(R*f)*(1/X)$ can be obtained from the first equation.

The method of calculating the height Z of the object 20 is described as follows. Because the perpendicular triangle K1-J-L is similar to the perpendicular triangle L-N-P, a second equation $(X-Y)/f=(R-Z)/D1$ can be obtained therefrom. As the first distance D1 has been calculated by the first equation, $D1=(R*f)*(1/X)$, the second equation is substituted by the first distance D1 and simplified, so that the height Z of the object 20 is obtained as $R*(Y/X)$.

Figure 3B:
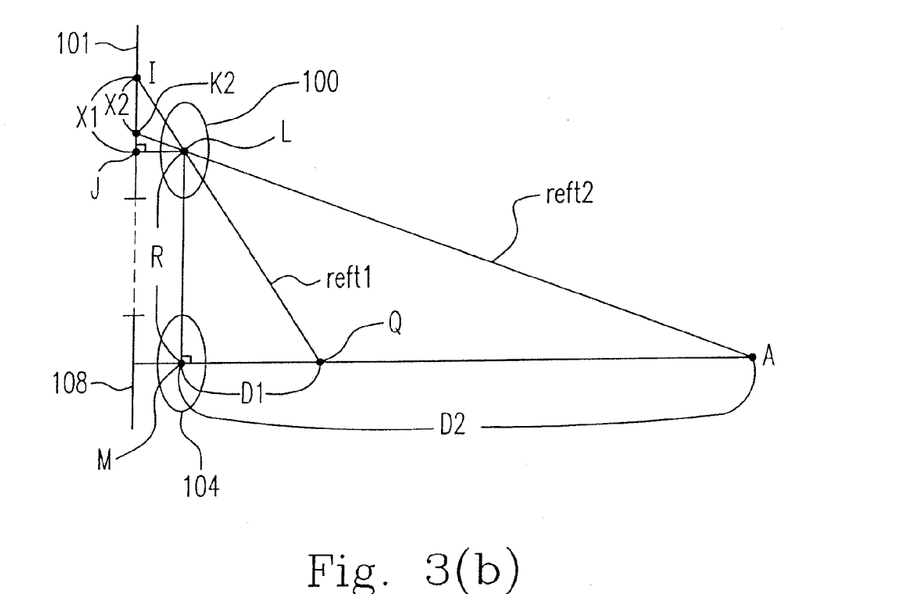
FIG. 3(b) shows the diagram of detecting the object's location by triangulation in the system module.

Please refer to FIG. 3(b), which shows the diagram of detecting the object's location by triangulation in the system module. In FIG. 3(b), reft1 represents the first reflection, reft2 represents the second reflection, R represents the distance from the central point L of the lens 100 to the central point M of the horizontal cylindrical lens 104, the first distance D1 represents the distance from M point in the horizontal cylindrical lens 104 to Q point at which the object 20 is, the second distance D2 represents the distance from M point in the horizontal cylindrical lens 104 to A point at which the object 20 is, and f represents the distance from the central point L of the lens 100 to J point in the image sensor 101. The object 20 locates at Q point, and forms image at I point in the image sensor 101. The object 20 moves to A point, and forms image at K2 point in the image sensor 101.

In FIG. 3(b), X1 represents the distance from I point to J point, and X2 represents the distance from I point to K2 point. X1 is the same as X in FIG. 3(a). The line formed by J point and L point is perpendicular to that formed by J point and I point. Two similar groups of perpendicular triangles can be seen in FIG. 3(b). The first group includes perpendicular triangles I-J-L and L-M-Q, and the second group includes perpendicular triangles K2-J-L and L-M-A. The first distance D1 can be obtained by sensing X1, and the second distance D2 can be obtained by sensing X1 and X2. X1 can be obtained by sensing the location of the first reflection reft1 in the image sensor 101 via the image sensor 101, and X2 can be obtained by sensing the location of the second reflection reft2 in the image sensor 101 via the image sensor 101.

The method of calculating the first distance D1 is described as follows. Because the perpendicular triangle I-J-L is similar to the perpendicular triangle L-M-Q, a third equation $X1/f=R/D1$ can be obtained therefrom. As R and f are known constants and X1 is a known sensing value, the first distance $D1=(R*f)*(1/X1)$ can be obtained from the third equation.

The method of calculating the second distance D2 is described as follows. Because the perpendicular triangle K2-J-L is similar to the perpendicular triangle L-M-A, a forth equation $(X1-X2)/f=R/D2$ can be obtained therefrom. As R and f are known constants and X1 and X2 are known sensing values, the second distance $D2=(R*f)*(X1-X2)$ can be obtained from the forth equation.

The time when the object 20 moves from Q point to A point is equal to the time when the object 20 forms image from I point to K2 point, which can be estimated by the system module 113. Thus, the speed that the object 20 moves from Q point to A point can be obtained.

Methods of optical distance calculation include the time-of-flight method, the phase method and the triangulation. The time-of-flight method uses the time difference between the emitted light and the reflection to calculate the distance between the observer and the obstacle, and is quite useful for far distance calculation. The phase method uses the phase difference between the emitted light and the reflection to calculate the distance between the observer and the obstacle, and is quite useful for short distance calculation. The above-mentioned methods of optical distance calculation are prior arts, so they will not be described in detail here.

In FIG. 1, the image sensing device 116 has the functions of converting the light signal to the electronic signal and converting the analog electronic signal to the digital electronic signal (A/D conversion). The image sensor 101 converts the light signal to the digital message D_Signal after sensing the light signal. The system module 113 uses the digital message D_Signal and triangulation to obtain the distance between the object 20 and the optical blind-guide apparatus 10, and enables the audio device 103 to remind the user of road condition in voice. For example, in FIG. 3(b), when the object 20 is near or distant from the optical blind-guide apparatus 10, the system 113 can obtain the first distance D1 and/or the second distance D2, and enable the audio device 103 to send out speech sounds to notify the user of the distance between the object 20 and the user.

In general conditions, the above-mentioned method can achieve the goal of guiding the user. However, when exceptional conditions are met, the user can choose to notify service personnel for assistance. At this time, the filter turntable 102 can choose not to filter the visible light, and the digital message D_Signal is compressed by the compression chip 110 to form the image data Im_Data, which can be saved in the SD memory card 111 and/or sent to external devices. For example, the external device can be a 3G communication device 30 which preferably can send the voice and image data. In FIG. 1, the image data Im_Data are sent to the communication device 30 through the mini USB interface 114, and then the communication device 30 sends the image data to the service center 80 through the base station 60 and the telecommunication company 70. This enables the service center 80 to oversee the image of the environment at which the user locates immediately, and guide the user based thereon.

Figure 4:
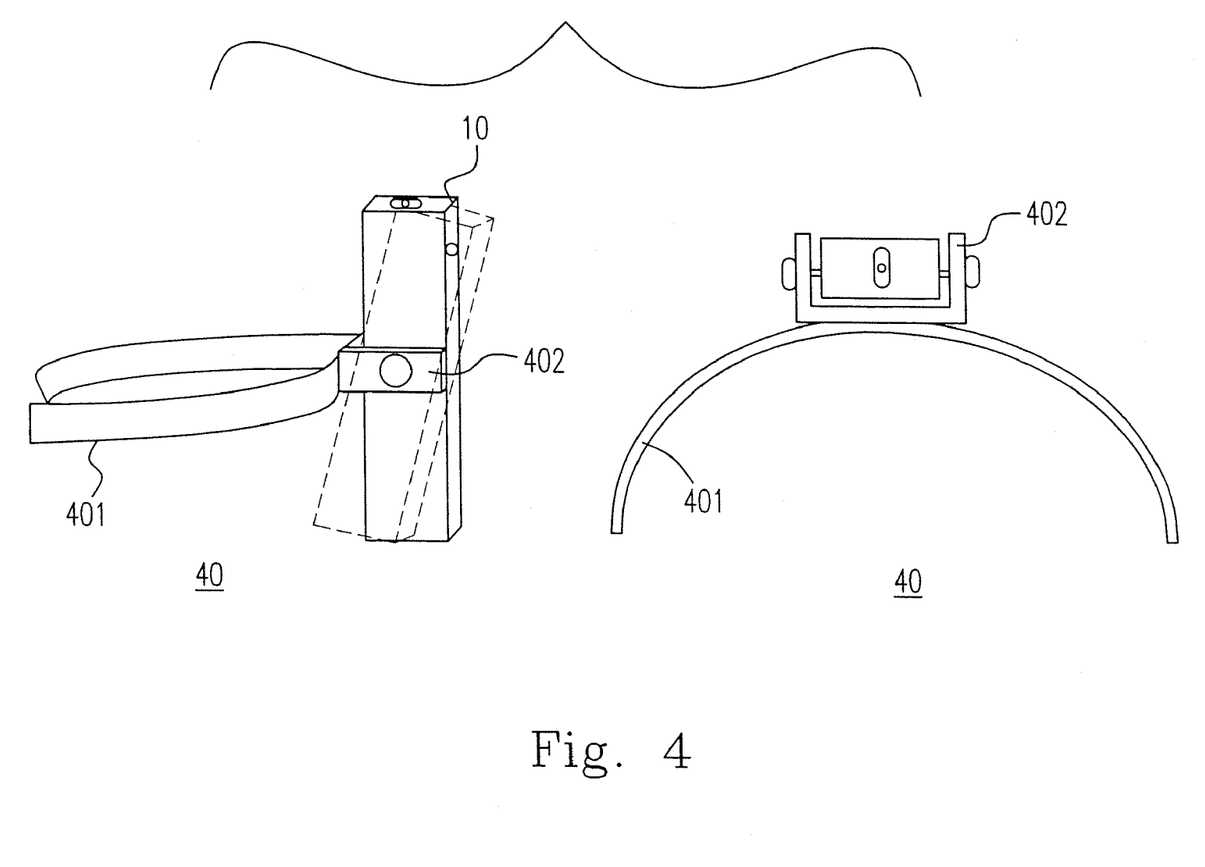
FIG. 4 shows the diagram of the optical blind-guide apparatus with a strap according to a preferred embodiment of the present invention.

Please refer to FIG. 4, which shows the diagram of the optical blind-guide apparatus with a strap according to a preferred embodiment of the present invention. The optical blind-guide apparatus with a strap 40 includes the optical blind-guide apparatus 10, a fixing strap 401 and an adjusting apparatus 402. The adjusting apparatus 402 can adjust the angle of the optical blind-guide apparatus 10 to be upward or downward to enable the horizontal infrared 1060 and/or the vertical infrared 1040 to scan obstacles of different heights and/or different distances.

Figure 5:
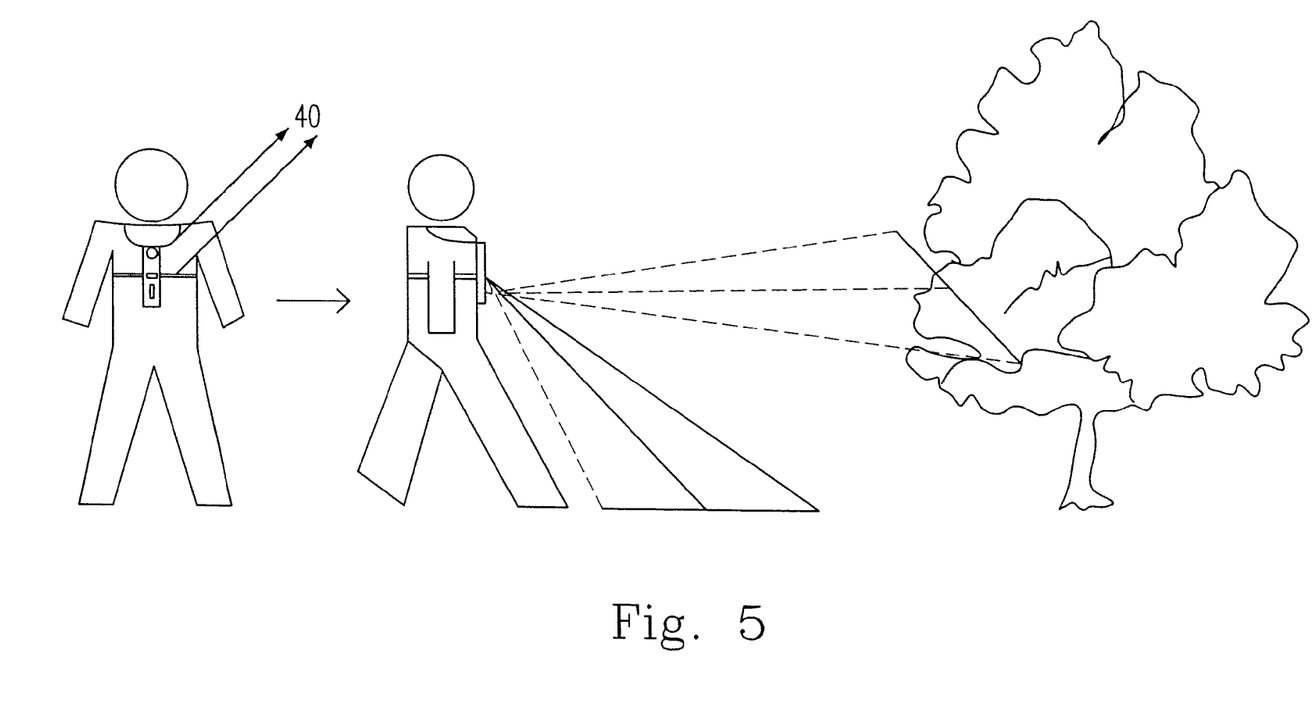
FIG. 5 shows a user who wears the optical blind-guide apparatus.

Please refer to FIG. 5, which shows a user who wears the optical blind-guide apparatus. The user can put the optical blind-guide apparatus 10 before his chest or forehead, adjust the height of the strap according to his demand, and use the fixing strap 401 to bind tightly to help fixing. Hence, the obstacles can be detected when the user walks forward.

Figure 6:
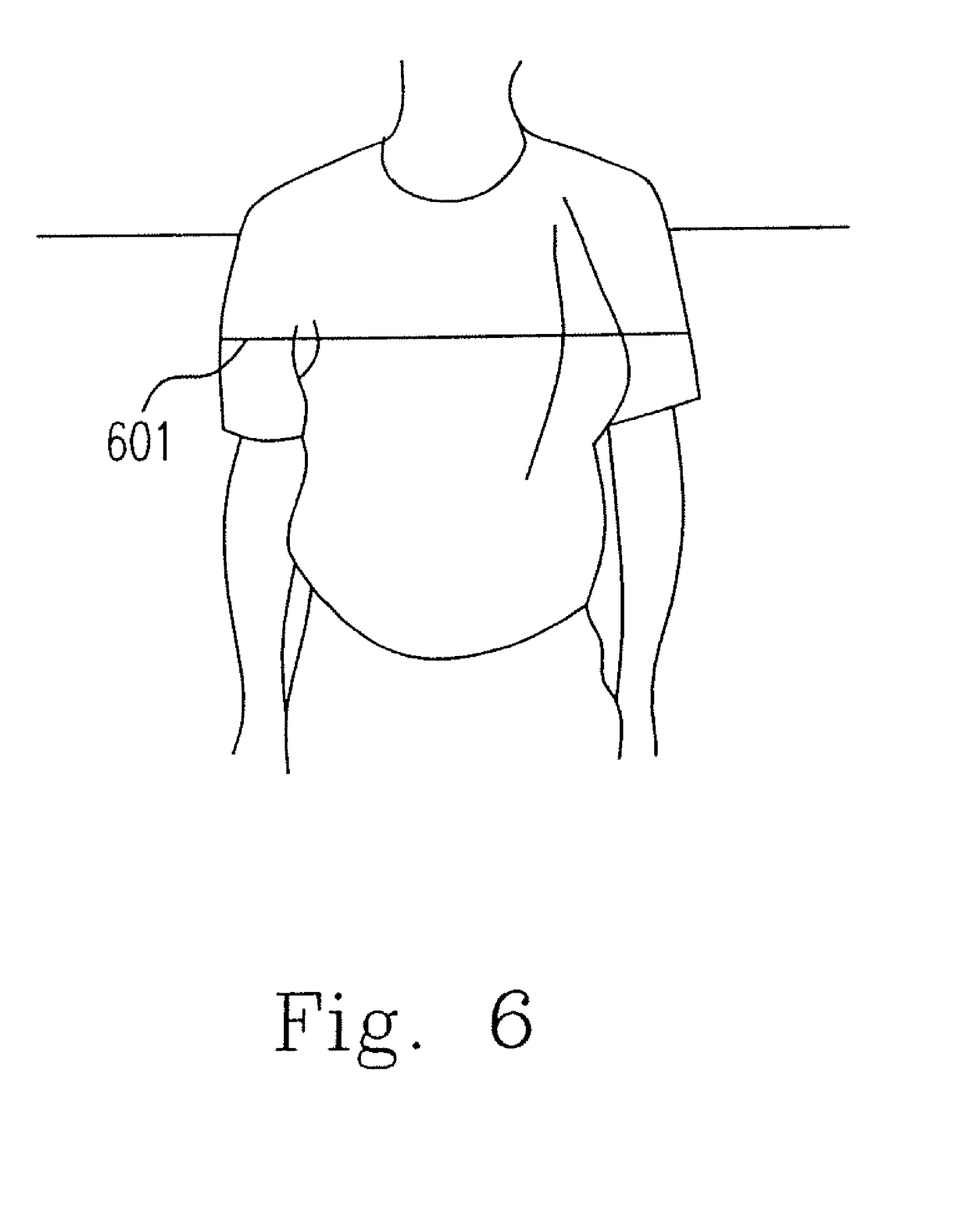
FIG. 6 shows the diagram of the distance and size calculation of the obstacle by the horizontal line-shaped laser beam in the system module.

Please refer to FIG. 6, which shows the diagram of distance calculation by the horizontal line-shaped laser beam in the system module. After a horizontal line-shaped laser beam 601 is illuminated on a dummy, the originally continuous horizontal line-shaped laser beam 601 appearing not continuous at the join of the dummy and the background can be observed. This condition is because the distance between the background and the observer is different from that between the dummy and the observer. The principle and distance calculation of this condition have been illustrated in FIGS. 3(*a*) and 3(*b*).

Generally speaking, the operation method of the optical blind-guide apparatus includes the following steps. Firstly, the illuminant module 115 provides at least one infrared laser beam 1050. Secondly, the object 20 reflects the at least one infrared laser beam 1050 to form a reflection, which is the first vertical infrared reflection FOV1, the second vertical infrared reflection FOV2, the first reflection reft1 and the second reflection reft2. Thirdly, the image sensor 101 senses the reflection and converts it to a digital message D_Signal. Fourthly, the system module 113 uses the digital message D_Signal and triangulation to obtain the distance between the object 20 and the optical blind-guide apparatus 10. Fifthly, the system module 113 enables the audio device 103 to notify the user in voice according to the distance between the object 20 and the optical blind-guide apparatus 10.

In exceptional conditions, the operation method of the optical blind-guide apparatus 10 includes the following steps. Firstly, the optical blind-guide apparatus 10 provides a real-time image. Secondly, the optical blind-guide apparatus 10 uses the mini USB interface 114 to send the real-time image to the communication device 30. Thirdly, according to the real-time image, the service personnel instruct the user through the communication device 30.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical blind-guide apparatus for detecting an object, comprising:
    an illuminant module illuminating the object to form a reflection light from the object;
    a sensor sensing the reflection light to generate a digital message;
    a system module receiving and processing the digital message to obtain a blind-guide information by a distance calculation based on triangulation; and
    an output device coupled with the system module and outputting the blind-guide information.

2. An optical blind-guide apparatus as claimed in claim 1, wherein the system module obtains an information of a distance between the object and the optical blind-guide apparatus, and the output device provides a user with the information of the distance.

3. An optical blind-guide apparatus as claimed in claim 1, wherein the illuminant module generates a beam having various wavelengths and comprises a horizontal cylindrical lens and a vertical cylindrical lens, the horizontal cylindrical lens disperses the beam into a vertical fan-shaped beam, and the vertical cylindrical lens disperses the beam into a horizontal fan-shaped beam.

4. An optical blind-guide apparatus as claimed in claim 1, wherein the sensor comprises a filter, the reflection light comprises a first part having a first wavelength between 700 and 1200 nm and a second part having a second wavelength different from the first wavelength, and the filter makes the first part pass therethrough and filters out the second part.

5. An optical blind-guide apparatus as claimed in claim 1, wherein the sensor comprises an image sensor, which is one of a CCD and a CMOS image sensors.

6. An optical blind-guide apparatus as claimed in claim 1, further comprising a storage device for saving a data generated from the system module.

7. An optical blind-guide apparatus as claimed in claim 6, wherein the data is a compressed data.

8. An optical blind-guide apparatus as claimed in claim 6, further comprising an interface for coupling the optical blind-guide apparatus to an outside device, and transmitting the data to the outside device via the interface.

9. An optical blind-guide apparatus as claimed in claim 8, wherein the outside device is a communication device.

10. An optical blind-guide apparatus, comprising:
    a sensor receiving a reflection light from an object to generate a message; and
    a system module receiving and processing the message to obtain a blind-guide information by a distance calculation of triangulation.

11. An optical blind-guide apparatus as claimed in claim 10, further comprising a laser beam module for generating a laser beam to illuminate the object and obtain the reflection light, wherein the message is a digital message, and the laser beam module comprises a horizontal cylindrical lens and a vertical cylindrical lens, the horizontal cylindrical lens disperses the laser beam into a vertical fan-shaped laser beam, and the vertical cylindrical lens disperses the laser beam into a horizontal fan-shaped laser beam.

12. An optical blind-guide apparatus as claimed in claim 11, wherein the laser beam module generates the laser beam per a time interval to reduce power consumption of the laser beam module, and the time interval is in a range of $\frac{1}{15}$ to $\frac{1}{60}$ second.

13. An optical blind-guide apparatus as claimed in claim 10, further comprising an output device coupled to the system module and outputting the blind-guide information, and a storage device for saving a data generated from the system module.

14. An optical blind-guide apparatus as claimed in claim 13, further comprising an interface for coupling the optical blind-guide apparatus to an outside device and transmitting the data to the outside device via the interface.

15. A method for operating an optical blind-guide apparatus, the method comprising:
    (a) receiving a reflection light from an object;
    (b) converting the reflection light to a message; and
    (c) obtaining a blind-guide information based on the message and a distance calculation of triangulation.

16. A method as claimed in claim 15, wherein the step (a) further comprises a sub-step of generating a beam for illuminating the object to form the reflection light.

17. A method as claimed in claim 16, wherein the beam is an infrared laser beam.

18. A method as claimed in claim 15, wherein the blind-guide information comprises a distance between the object and the optical blind-guide apparatus.

19. A method as claimed in claim 15, further comprising a step of providing a user with the blind-guide information in a voice.

* * * * *